United States Patent [19]

Kotabe

[11] Patent Number: 5,170,265
[45] Date of Patent: Dec. 8, 1992

[54] IMAGE FORMING APPARATUS USING A SEQUENCER STORING PRINT START COMMANDS

[75] Inventor: Hiroaki Kotabe, Funabashi, Japan

[73] Assignee: Ricoh Company, Ltd., Tokyo, Japan

[21] Appl. No.: 601,882

[22] Filed: Oct. 22, 1990

[30] Foreign Application Priority Data

Oct. 31, 1989 [JP] Japan .................................. 1-283909

[51] Int. Cl.⁵ .......................... H04N 1/32; H04N 1/21
[52] U.S. Cl. .................................... 358/468; 358/448; 358/444
[58] Field of Search ............... 358/468, 474, 498, 903, 358/444, 448; 364/518-519, 523

[56] References Cited

U.S. PATENT DOCUMENTS

| | | | |
|---|---|---|---|
| 4,511,928 | 4/1985 | Colomb | 358/468 |
| 4,903,146 | 2/1990 | Nakahara | 358/448 |
| 5,021,892 | 6/1991 | Kita et al. | 358/448 |
| 5,055,935 | 10/1991 | Ohno | 358/468 |
| 5,107,338 | 4/1992 | Saito | 358/444 |

FOREIGN PATENT DOCUMENTS 62-160257 7/1987 Japan .

*Primary Examiner*—Stephen Brinich
*Attorney, Agent, or Firm*—Cooper & Dunham

[57] ABSTRACT

An image forming apparatus includes an image data processor, an image forming part, and a sequence controller for controlling an image forming operation of the image forming part. The image data processor transmits to the sequence controller a print start signal which instructs a start of the image forming operation of the image forming part every time the image data is prepared in the image data processor regardless of whether or not the image forming part is in a ready state in which the image forming part is ready to carry out the image forming operation. The sequence controller includes a memory for storing the print start signal from the image data processor and a part for supplying the stored print start signal and the image data from the image data processor to the image forming means. The memory has a memory capacity for storing a plurality of print start signals.

7 Claims, 8 Drawing Sheets

IMAGE FORMING APPARATUS USING A SEQUENCER STORING PRINT START COMMANDS

BACKGROUND OF THE INVENTION

The present invention generally relates to image forming apparatuses, and more particularly to an image forming apparatus which is used as a computer terminal.

Conventionally, there is an image forming apparatus which is used as a computer terminal and includes an image data processor and a sequence controller. The image data processor receives a print code and converts the print code into an image data. The sequence controller receives a print start command after the image data is prepared in the image data processor. The sequence controller uses this print start command to control the image forming operation so as to form an image dependent on the image data. While the image forming apparatus carries out the image forming operation, the sequence controller is prohibited from accepting the print start command for a predetermined time.

Because the sequence controller is prohibited from accepting the print start command for the predetermined time, the generation of the next print start command must be delayed until the next image forming operation becomes possible, even when the next image data is already prepared in the image data processor. As a result, there is a problem in that it is impossible to greatly increase the image forming speed.

In other words, in the case of an image forming apparatus which is used as a general copying machine, for example, a number of copies to be formed is set and a copy start button is pushed to form the copies. However, in the case of an image forming apparatus which is used as a printer of a computer system, for example, the image to be printed is usually different for each page. For this reason, a print start command must be transmitted to the sequence controller for each page every time a print condition is satisfied, and it takes time to carry out the printing operation.

SUMMARY OF THE INVENTION

Accordingly, it is a general object of the present invention to provide a novel and useful image forming apparatus in which the problem described above is eliminated.

Another and more specific object of the present invention is to provide an image forming apparatus comprising an image data processor for converting a received code into an image data and for outputting the image data and a print start signal, image forming means for carrying out an image forming operation to form on a recording sheet an image described by the image data in response to the print start signal, and a sequence controller coupled between the image data processor and the image forming means for controlling an image forming operation of the image forming means, where the image data processor transmits to the sequence controller the print start signal which instructs a start of the image forming operation of the image forming means every time the image data is prepared in the image data processor regardless of whether or not the image forming means is in a ready state in which the image forming means is ready to carry out the image forming operation, the sequence controller includes memory means for storing the print start signal from the image data processor and means for supplying the stored print start signal and the image data from the image data processor to the image forming means, and the memory means has a memory capacity for storing a plurality of print start signals. According to the image forming apparatus of the present invention, the print start signal is transmitted from the image data processor to the sequence controller when the image data is prepared in the image data processor, regardless of whether or not the image forming means is in the ready state. For this reason, there is no need to delay the transmission of the print start signal to the sequence controller until the image forming means assumes the ready state, and it is therefore possible to increase the speed of the image forming operation because of the reduced waiting time.

Other objects and further features of the present invention will be apparent from the following detailed description when read in conjunction with the accompanying drawings.

DESCRIPTION OF THE PREFERRED EMBODIMENTS

Figure 1:
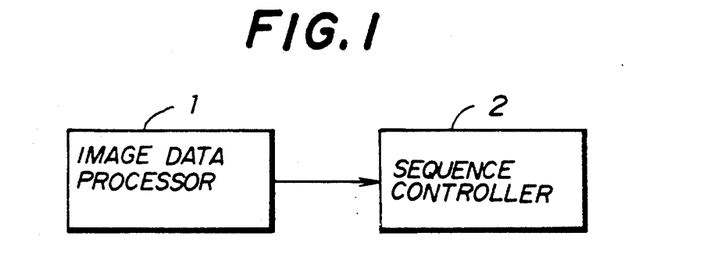
FIG. 1 is a system block diagram for explaining an operating principle of an image forming apparatus according to the present invention.

First, a description will be given of an operating principle of an image forming apparatus according to the present invention, by referring to FIG. 1. In FIG. 1, the image forming apparatus includes an image data processor 1 and a sequence controller 2. The image data processor 1 receives a print code and converts this print code into an image data. The sequence controller 2 controls an image forming operation of the image forming apparatus to form an image dependent on the image data. A print start command is transmitted to the sequence controller 2 after the image data is prepared in the image data processor 1. The sequence controller 2 includes a memory which can store print start commands corresponding to a plurality of pages, and the print start command from the image data processor 1 is stored in this memory. Hence, the image forming operation of the image forming apparatus is carried out based on the print start command which is stored in the memory.

Figure 2:
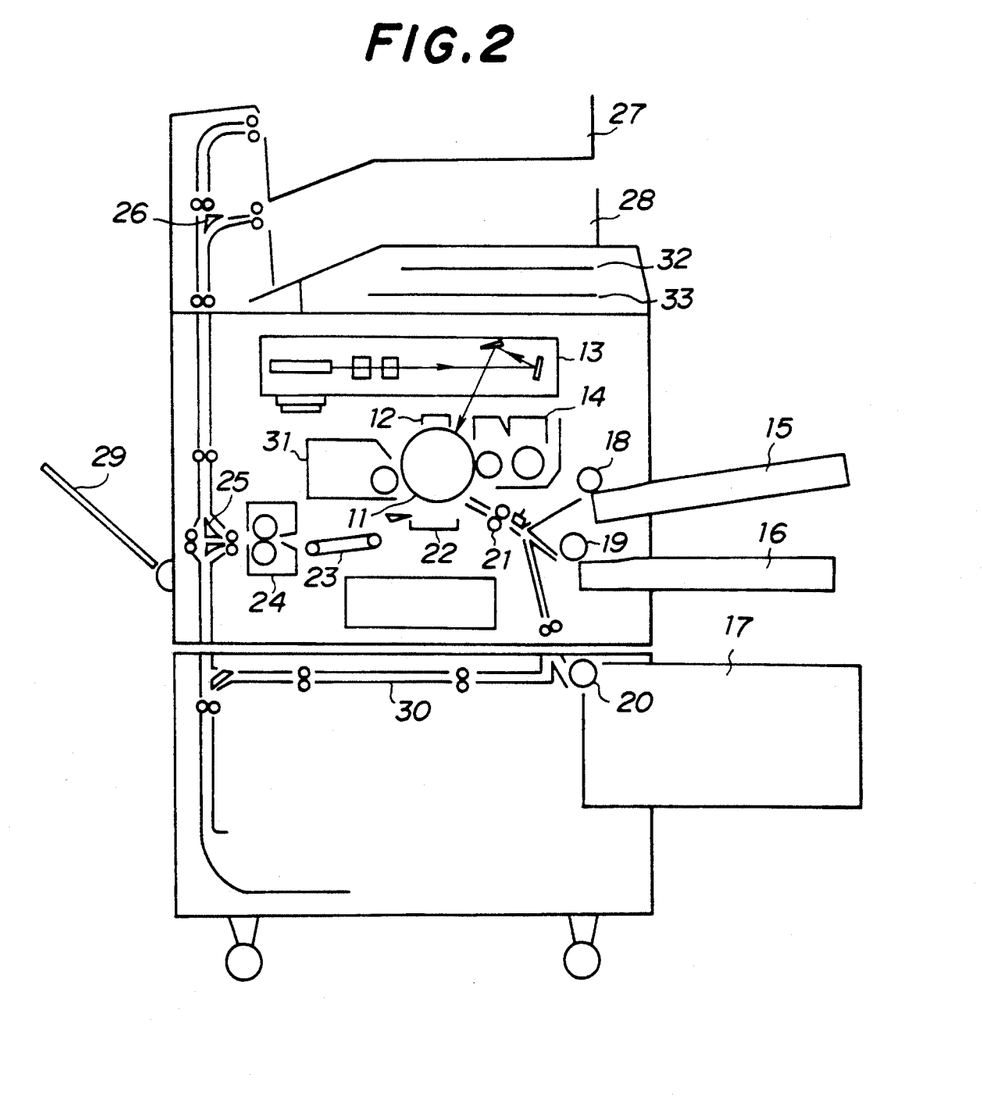
FIG. 2 is a side view in cross section generally showing an embodiment of the image forming apparatus according to the present invention.

Next, a description will be given of an embodiment of the image forming apparatus according to the present invention, by referring to FIG. 2. FIG. 2 generally shows the embodiment of the image forming apparatus, and in this embodiment, the present invention is applied to a laser beam printer.

In the laser beam printer shown in FIG. 2, a photoconductive (or photosensitive) drum 11 is rotated by a motor (not shown) when carrying out an image formation, and an outer peripheral surface of the drum 11 is uniformly charged by a corona discharger 12. A laser write unit 13 modulates a laser beam by the image data and irradiates the laser beam on the charged surface of the drum 11 in a main scanning direction along the axis of the drum 11. Hence, an electrostatic image is formed on the surface of the drum 11, and a developing unit 14 develops this electrostatic image into a visual image.

A recording sheet is supplied from one of an upper supply tray 15, a lower supply tray 16 and a large supply tray 17 by a corresponding one of an upper roller 18, a lower roller 19 and a roller 20 up to a mechanism which includes resist rollers 21 for synchronizing a tip end of an image which is formed on the recording sheet. The resist rollers 21 supply the recording sheet with a timing such that the tip end of the recording sheet matches the tip end of the visual image which is formed on the drum 11. A corona discharger 22 transfers the visual image which is formed on the drum 11 onto the recording sheet. The recording sheet which is provided with the image is transported by a transport belt 23 and a fixing unit 24 fixes the image which is formed on the recording sheet.

In a one-sided print mode, eject path switching units 25 and 26 control the eject path so that the printed recording sheet is ejected to one of an upper eject tray 27, a lower eject tray 28 and a side eject tray 29. On the other hand, in a two-sided print mode, the printed recording sheet having the image formed on one side thereof is supplied to a transport path 30 via the eject path switching unit 25 and the reversed recording sheet is transported to the resist rollers 21. An image is formed on the other side of the recording sheet similarly as described above and is ejected to one of the eject trays 27, 28 and 29.

After the image is transferred onto the recording sheet, a cleaning unit 31 cleans the surface of the drum 11 to prepare for a next image formation.

The laser beam printer further includes a sequence controller 32, an image data processor 33, and an operation and display part (not shown). The operation and display part includes keys for controlling the operation of the laser beam printer and a display for displaying various information.

Figure 3:
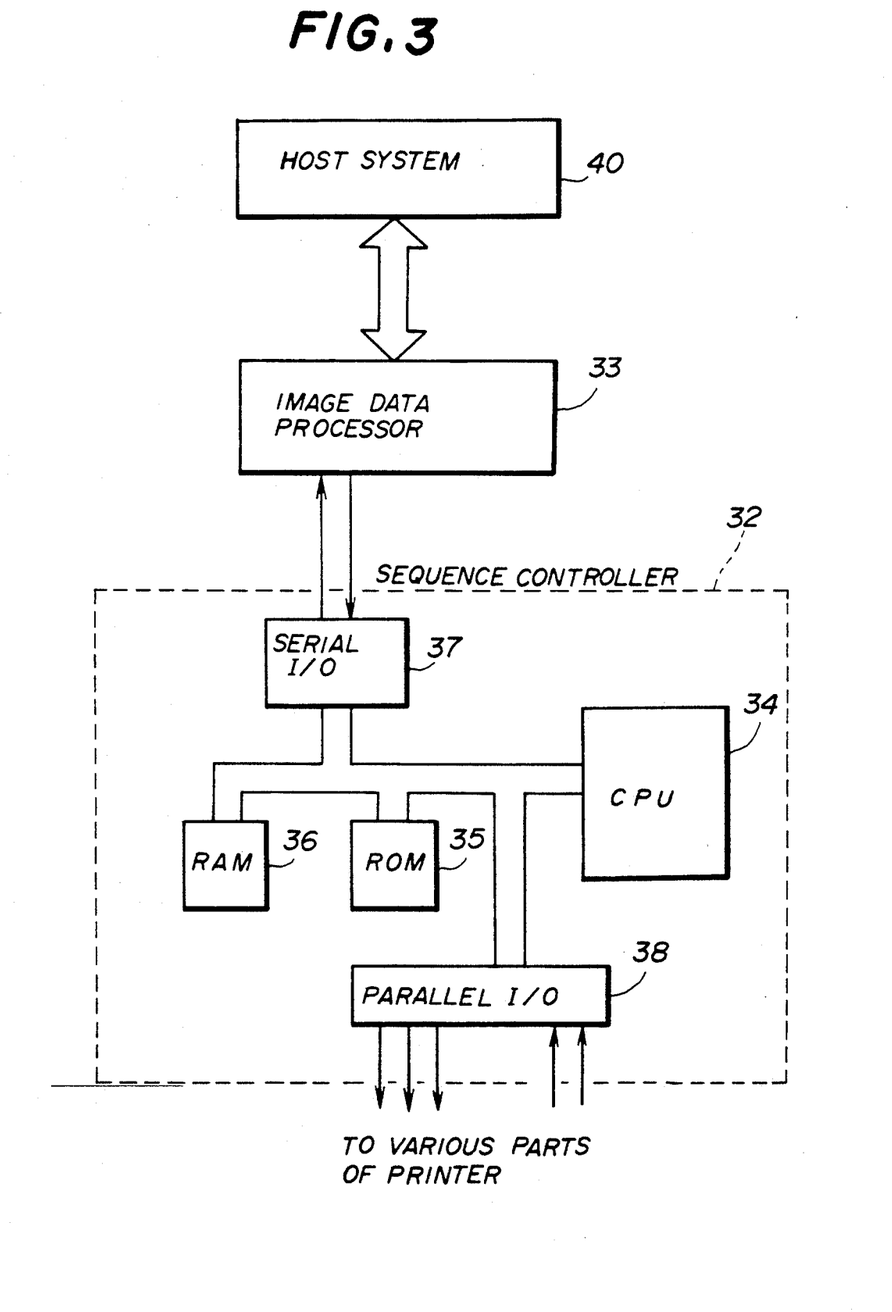
FIG. 3 is a system block diagram showing an essential part of the embodiment shown in FIG. 2.

FIG. 3 shows the sequence controller 32 and the image data processor 33. The sequence controller 32 is made up of a microcomputer which includes a central processing unit (CPU) 34, a read only memory (ROM) 35, a random access memory (RAM) 36, a serial input/output port 37 and a parallel input/output port 38. The serial input/output port 37 is coupled to the image data processor 33. On the other hand, the parallel input/output port 38 is coupled to various parts of the laser beam printer.

The image data processor 33 is coupled to a host system 40 which may be a computer, a word processing system or the like. The print code which is transmitted from the host system 40 is converted into an image data for modulating the laser beam and selection signals for selecting the paper supply path, the paper eject path, the print mode and the like. For example, the print mode includes the one-sided print mode and the two-sided print mode. The image data and the selection signals are temporarily stored within the image data processor 33.

When the image data processor 33 receives from the host system 40 all the data required to start the print operation, the image data processor 33 supplies to the sequence controller 32 the image data, the selection signals and a print start signal so as to start the print sequence control of the sequence controller 32. The sequence controller 32 selects one of the supply trays 15, 16 and 17 in response to a supply path selection signal from the image data processor 33, controls the eject path switching units 25 and 26 in response to an eject path selection signal from the image data processor 32, and selects the one-sided print mode, the two-sided print mode or the like in response to a print mode selection signal from the image data processor 33. In addition, the sequence controller 32 starts the print sequence control in response to the print start signal from the image data processor 33, so as to start the print operation described above. Hence, the laser beam is modulated by the image data in the laser write unit 13.

Commands from the image data processor 33 are transmitted to the sequence controller 32 by serial transmission of command codes. The print start signal includes a paper supply start command and a print start command. A code "FF" in ASCII code is assigned to the paper supply start command. The sequence controller 32 instructs the start of the paper supply from the selected one of the supply trays 15, 16 and 17 to the resist rollers 21 by the paper supply start command. A code "VT" in ASCII code is assigned to the print start command. The sequence controller 32 instructs the start of the image formation by the print start command. The image formation includes the charging of the drum 11, exposure of the charged drum 11, developing of the electrostatic image on the drum 11, transfer of the visualized image onto the recording sheet, and fixing of the image transferred on the recording sheet described above.

Figure 4:
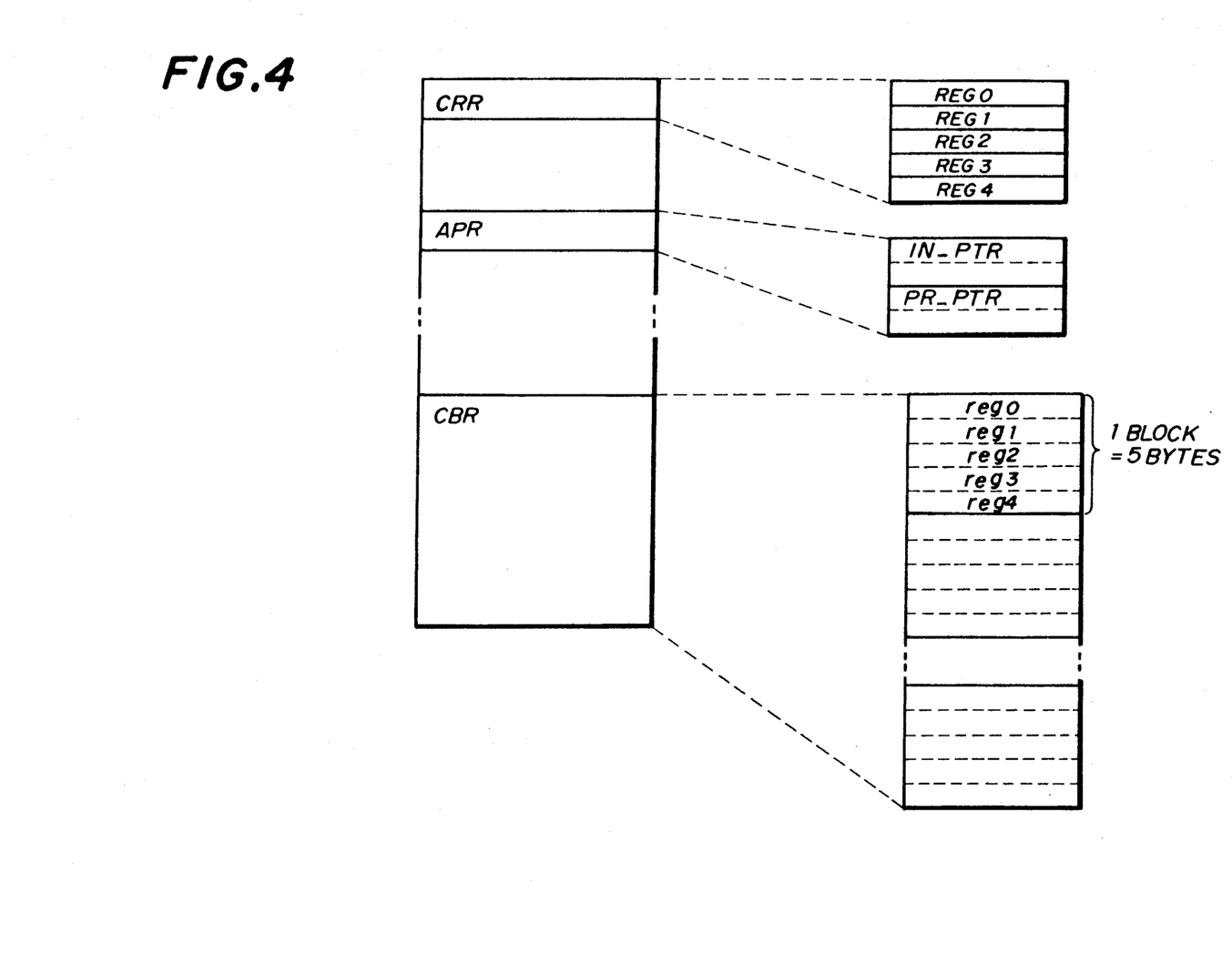
FIG. 4 is a diagram for explaining contents of a RAM shown in FIG. 3.

The RAM 36 of the sequence controller 32 includes a command register region CRR, an address pointer region APR and a command buffer region CBR as shown in FIG. 4. The command register region CRR includes command registers REG0 through REG4 which amount to 5 bytes. The address pointer region APR includes address pointers IN_PTR and C_FF. The command buffer region CBR includes command buffers amounting to 15 blocks, where each block includes command buffers reg0 through reg4 which amount to 5 bytes.

Each selection signal which is supplied from the image data processor 33 to the sequence controller 32 has a 2-byte structure in which the first byte (operand) represents the kind of command and the second byte (argument) represents the selection content of the command. The most significant bit (MSB) of the argument is "1". Each of the command registers REG0 through REG4 of the command register region CRR have a 1-byte structure, and the MSB of the argument is set to "0" when stored in the command registers REG0 through REG4.

Figure 5:
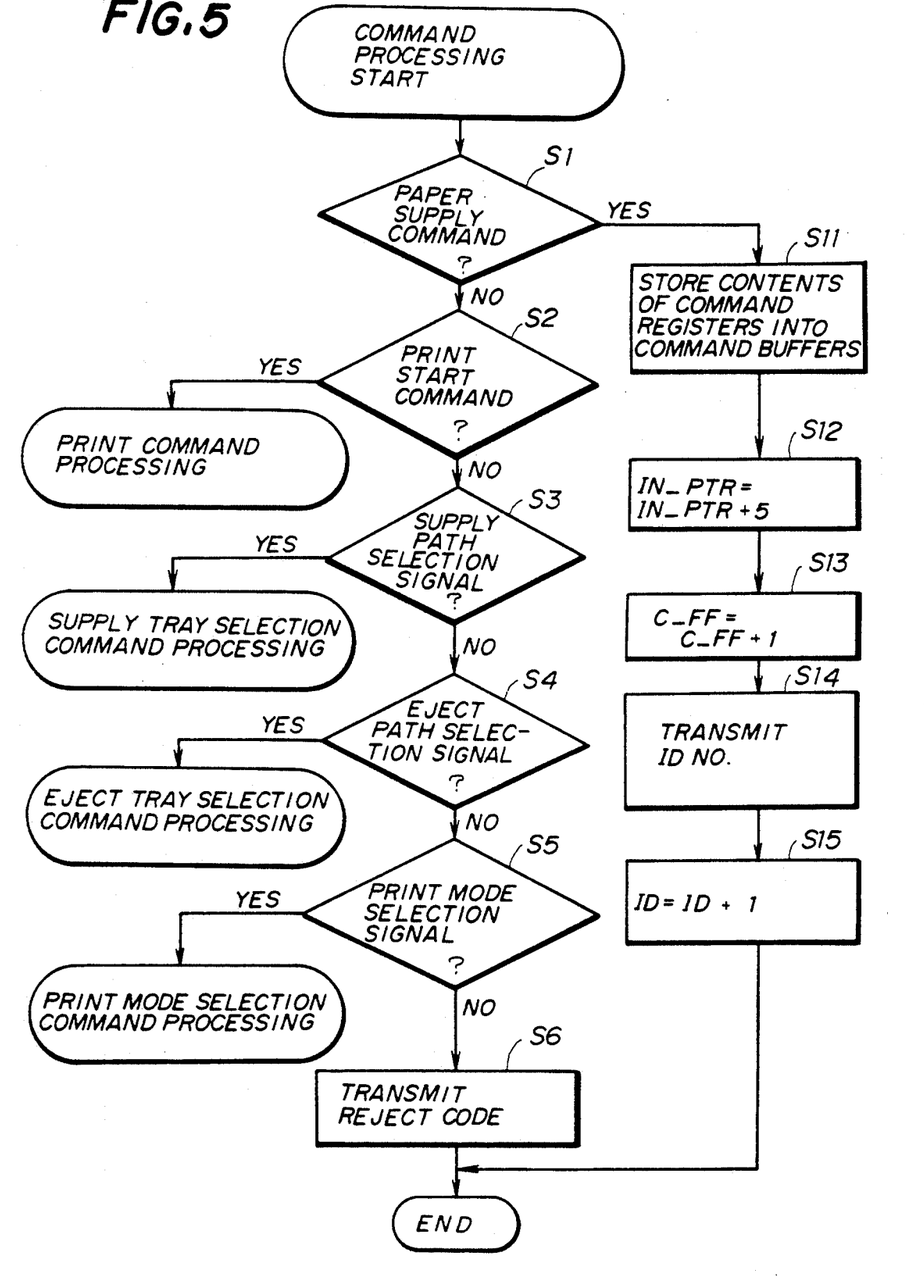
FIGS. 5 through 9 respectively are flow charts for explaining an operation of a CPU shown in FIG. 3.

FIG. 5 is a flow chart for explaining a command processing of the CPU 34 of the sequence controller 32. When the command processing starts, a step S1 judges whether or not the paper supply command is received from the image data processor 33. When the judgement result in the step S1 is NO, a step S2 judges whether or not the print start command (print command) is received from the image data processor 33. When the judgement result in the step S2 is NO, a step S3 judges whether or not the supply path selection signal (supply tray selection command) is received from the image data processor 33. When the judgement result in the step S3 is NO, a step S4 judges whether or not the eject path selection signal (eject tray selection command) is received from the image data processor 33. When the judgement result in the step S4 is NO, a step S5 judges whether or not the print mode selection signal (print mode selection command) is received from the image data processor 33. When the judgement result in the step S5 is NO, a step S6 transmits a reject code to the image data processor 33 and the process ends. This step S6 is carried out when a command other than the paper supply command is received from the image data processor 33 and this command is none of the print command, supply tray selection command, eject tray selection command and print mode selection command.

Figure 6:
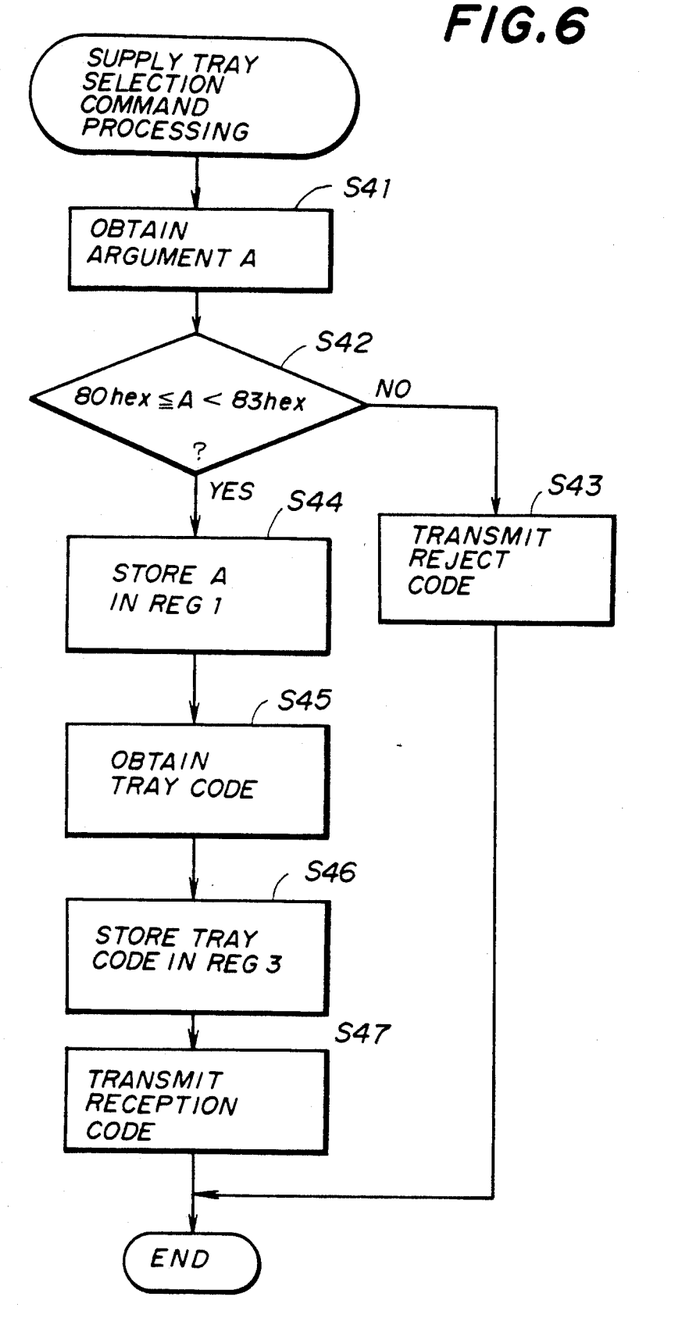

When the judgement result in the step S4 is YES, the CPU 34 carries out an eject tray selection command processing shown in FIG. 6. In FIG. 6, a step S41 obtains an argument A from the eject path selection signal (eject tray selection command), and a step S42 judges whether or not the argument A is valid, that is, whether or not 80 hex $\leq$ A $<$ 83 hex, where "hex" denotes a hexadecimal number. When the judgement result in the step S42 is NO, a step S43 transmits a reject code to the image data processor and the process ends.

On the other hand, when the judgement result in the step S42 is YES, a step S44 stores the argument A into the command register REG1 of the RAM 36. A step S45 obtains a tray code of the selected paper supply tray from the eject path selection signal (eject tray selection command), and a step S46 stores the tray code into the command register REG3 of the RAM 36. Then, a step S47 transmits a reception code to the image data processor 33 and the process ends.

Figure 7:
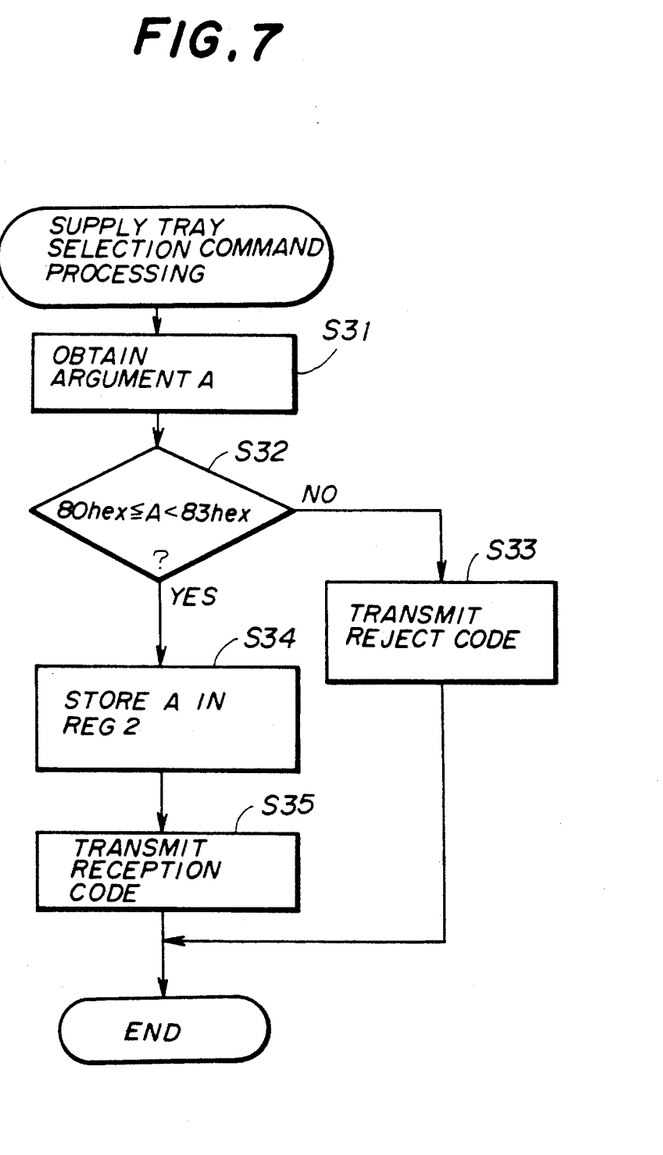

When the judgement result in the step S3 is YES, the CPU 34 carries out a supply tray command processing shown in FIG. 7. In FIG. 7, a step S31 obtains the argument A from the supply path selection signal (supply tray selection command), and a step S32 judges whether or not the argument A is valid, that is, whether or not 80 hex $\leq$ A $<$ 83 hex. When the judgement result in the step S32 is NO, a step S33 transmits a reject code to the image data processor 33 and the process ends.

On the other hand, when the judgement result in the step S32 is YES, a step S34 stores the argument A into the command register REG2 of the RAM 36. Then, a step S35 transmits a reception code to the image data processor 33 and the process ends.

Figure 8:
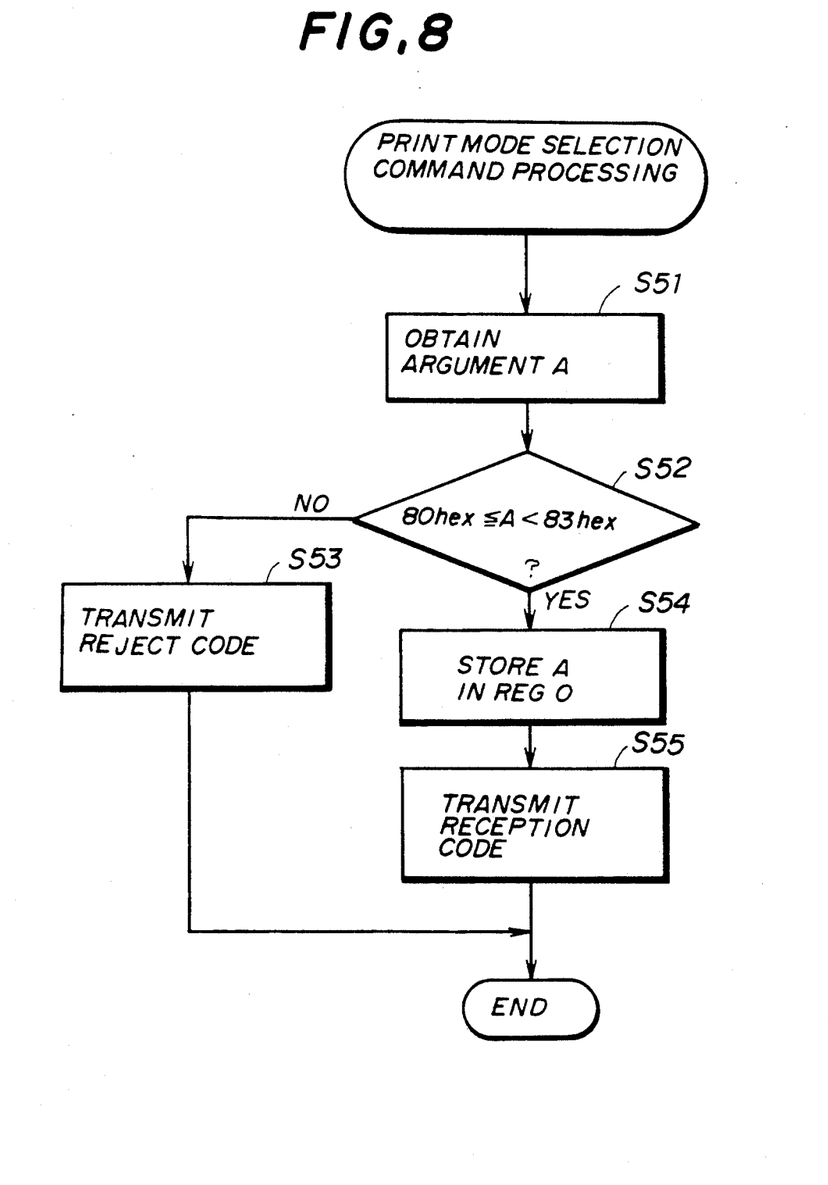

When the judgement result in the step S2 is YES, the CPU 34 carries out a print mode selection command processing shown in FIG. 8. In FIG. 8, a step S51 obtains the argument A from the print mode selection signal (print mode selection command), and a step S52 judges whether or not the argument A is valid, that is, whether or not 80 hex $\leq$ A $<$ 83 hex. When the judgement result in the step S52 is NO, a step S53 transmits a reject code to the image data processor 33 and the process ends.

On the other hand, when the judgement result in the step S52 is YES, a step S54 stores the argument A into the command register REG0 of the RAM 36. Then, a step S55 transmits a reception code to the image data processor 33 and the process ends.

The above described processes are carried out every time the selection signal is transmitted from the image data processor 33 to the sequence controller 32. Hence, only the most updated selection signal is stored in the command registers REG0 through REG3. The sequence controller 32 returns to the image data processor 33 the value stored in a corresponding one of the command registers REG0 through REG3 in response to each selection signal (selection command) which is received from the image data processor 33.

The operand of the supply path selection signal (supply tray selection command) is "I" (49 hex) in ASCII code. The argument of the supply path selection signal (supply tray selection command) is 81 hex when selecting the upper supply tray 15 and 82 hex when selecting the lower supply tray 16, for example. When the argument of the supply path selection signal (supply tray selection command) is 81 hex, the sequence controller 32 stores 01 hex into the command register REG1 of the RAM 36. On the other hand, when the argument of the supply path selection signal (supply tray selection command) is 82 hex, the sequence controller 32 stores 02 hex into the command register REGI of the RAM 36.

The operand of the eject path selection signal (eject tray selection command) is "0" (4 Fhex) in ASCII code. The argument of the eject path selection signal (eject tray selection command) is 81 hex when selecting the upper eject tray 27, 82 hex when selecting the lower eject tray 28, and 83 hex when selecting the side eject tray 29, for example. When the argument of the eject path selection signal (eject tray selection command) is 81 hex, the sequence controller 32 stores 01 hex into the command register REG2 of the RAM 36. On the other hand, when the argument of the eject path selection signal (eject tray selection command) is 82 hex, the sequence controller 32 stores 02 hex into the command register REG2 of the RAM 36. Furthermore, the sequence controller 32 stores 03 hex into the command register REG2 of the RAM 36 when the argument of the eject path selection signal (eject tray selection command) is 83 hex.

The operand of the print mode selection signal (print mode selection command) is "T" (54 hex) in ASCII code. The argument of the print mode selection signal (print mode selection command) is 80 hex when selecting a one-sided print mode, 81 hex when selecting the first two-sided print mode and 82 hex when selecting the second two-sided print mode, for example. The sequence controller 32 stores 00 hex into the command register REG0 of the RAM 36 when the argument of the print mode selection signal (print mode selection command) is 80 hex, 01 hex when the argument is 81 hex and 02 hex when the argument is 82 hex.

On the other hand, when the judgement result in the step S1 shown in FIG. 5 is YES, a step S11 sets the seventh bit of the command register REG0 to "1" and stores the contents of the command registers REG0 through REG4 into the command buffers reg0 through reg4 amounting to one block. A step S12 adds "5" to the address pointer IN_PTR. This address pointer IN_PTR specifies an address of the signal stored in the command buffers reg0 through reg4. Next, a step S13 adds "1" to the address pointer (paper supply counter) C_FF, a step S14 transmits an ID number of the recording sheet into the command buffer reg4 of the RAM 36, and a step S15 adds "1" to the ID number which is stored in the command buffer reg4. The process ends after the step S15.

Figure 9:
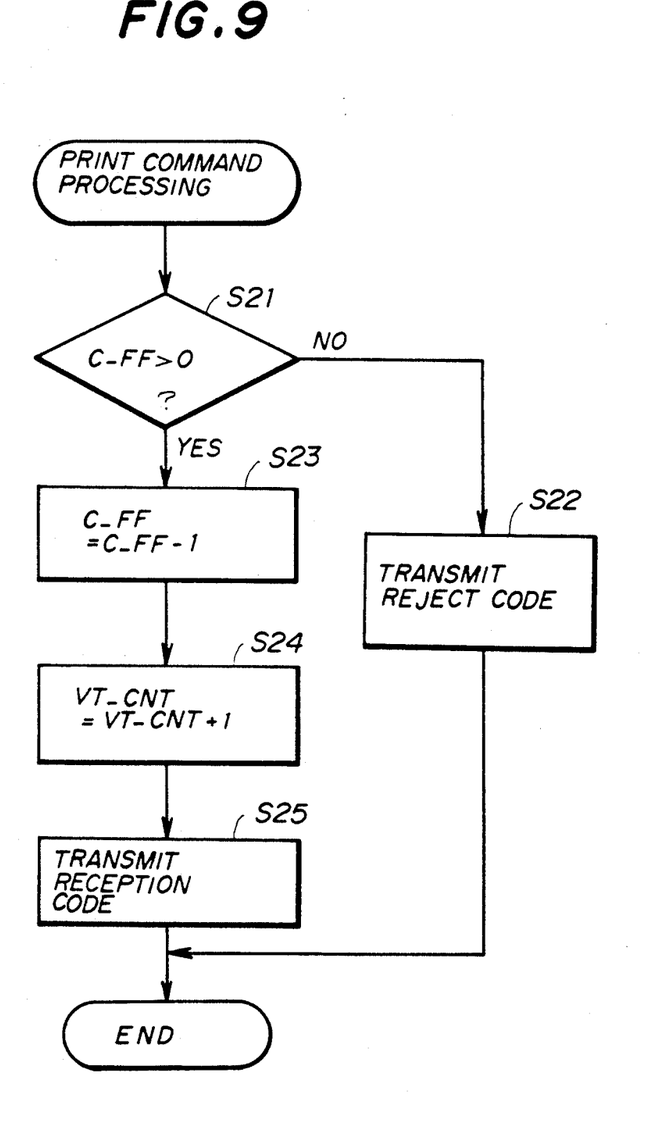

When the judgement result in the step S2 shown in FIG. 5 is YES, the CPU 34 carries out a print command processing shown in FIG. 9. In FIG. 9, a step S21 judges whether or not a paper supply command is already received, that is, whether or not C_FF>0. When the judgement result in the step S21 is NO, a step S22 transmits a reject code to the image data processor 33 and the process ends.

On the other hand, when the judgement result in the step S21 is YES, a step S23 subtracts "1" from the address pointer C_FF. Then, a step S24 adds "1" to a print start counter VT_CNT. A step S25 transmits a reception code to the image data processor 33, and the process ends.

When the parts of the laser beam printer is in a state possible to start the print operation and a print command which has the seventh bit of the first byte set to "1" is stored at an address specified by a print start counter PR_PTR, the sequence controller 32 controls the parts of the laser beam printer to start the print operation. In addition, the sequence controller 32 checks whether or not a print command is stored in the command buffer region CBR, and starts the print operation when the print command is stored in the command buffer region CBR. The sequence controller 32 controls the print sequence of the parts of the laser beam printer with predetermined timings based on a value of a software counter.

When the sequence controller 32 receives the print command from the image data processor 33, the sequence controller 32 adds "1" to the print start counter VT_CNT. When VT_CNT>0 and the parts of the laser beam printer is in the state possible to start the print operation, the print operation described above is carried out after setting the laser beam quantity of the laser write unit 13 with a predetermined timing. In this case, the sequence controller 32 subtracts "1" from the print start counter VT_CNT before the start of each print operation. Accordingly, print operations for a number of pages corresponding to the number of times the print command is received from the image data processor 33 are successively carried out on the laser beam printer.

In the described embodiment, the present invention is applied to the laser beam printer. However, the present invention may be applied to any type of image forming apparatus which is used as a terminal of a data processing system.

Further, the present invention is not limited to these embodiments, but various variations and modifications may be made without departing from the scope of the present invention.

What is claimed is:

1. An image forming apparatus comprising:
   an image data processor for converting a received code into image data and for outputting the image data and a print start signal;
   image forming means for carrying out an image forming operation to form on a recording sheet an image described by the image data in response to the print start signal; and
   a sequence controller coupled between said image data processor and said image forming means for controlling an image forming operation of said image forming means,
   said image data processor transmitting to said sequence controller the print start signal for an image forming operation of said image forming means whenever the image data is available from said image data processor, regardless of whether or not said image forming means is ready to carry out the image forming operation,
   said sequence controller including memory means for storing the print start signal from said image data processor and means for supplying the stored print start signal and the image data from said image data processor to said image forming means,
   said memory means having a memory capacity for storing a plurality of print start signals.

2. The image forming apparatus as claimed in claim 1, wherein said memory means has the memory capacity for storing a plurality of print start signals corresponding to a plurality of pages of recording sheets.

3. The image forming apparatus as claimed in claim 1, which further comprises at least one supply tray from which the recording sheet is supplied to said image forming means, said print start signal including a paper supply start command and a print start command, said paper supply start command causing a start of a paper supply from said supply tray to said image forming means, said print start command causing the start of an image formation of the image onto the recording sheet by said image forming means.

4. The image forming apparatus as claimed in claim 1, wherein said sequence controller includes means for checking whether or not a print start signal is stored in said memory means when said image forming means is in a ready state and for supplying the print start signal to said image forming means to start the image forming operation when the print start signal is stored in said memory means.

5. The image forming apparatus as claimed in claim 1, which further comprises a plurality of supply trays for supplying recording sheets, a plurality of eject paths through which the recording sheet is ejected, and a plurality of eject trays to which the recording sheet is ejected through the respective eject paths, said image data processor further supplying to said sequence controller respective selection signals for selecting one of the supply trays, one of the eject paths and one 6. The image forming apparatus as claimed in claim 1, wherein said image data processor receives said code from an external host system.

7. The image forming apparatus as claimed in claim 1, wherein said image forming means uses a laser beam to carry out said image forming operation.

* * * * *